United States Patent
Chiba et al.

(10) Patent No.: US 7,532,240 B2
(45) Date of Patent: May 12, 2009

(54) IMAGING APPARATUS AND IMAGING METHODS

(75) Inventors: Takuya Chiba, Tokyo (JP); Akira Hamano, Kanagawa (JP); Kenji Tanaka, Tokyo (JP)

(73) Assignee: Sony Corporation (JP)

( * ) Notice: Subject to any disclaimer, the term of this patent is extended or adjusted under 35 U.S.C. 154(b) by 794 days.

(21) Appl. No.: 11/117,295

(22) Filed: Apr. 29, 2005

(65) Prior Publication Data

US 2005/0253940 A1 Nov. 17, 2005

(30) Foreign Application Priority Data

May 17, 2004 (JP) .............................. 2004-145945

(51) Int. Cl.
*H04N 9/64* (2006.01)

(52) U.S. Cl. ...................................... 348/246; 348/247

(58) Field of Classification Search ................... 348/247
See application file for complete search history.

(56) References Cited

U.S. PATENT DOCUMENTS

| | | | | |
|---|---|---|---|---|
| 5,198,906 | A | * | 3/1993 | Yamashita ................... 348/246 |
| 5,381,175 | A | * | 1/1995 | Sudo et al. ................... 348/246 |
| 5,416,516 | A | * | 5/1995 | Kameyama et al. .......... 348/246 |
| 5,499,114 | A | * | 3/1996 | Compton ..................... 358/483 |
| 5,796,430 | A | | 8/1998 | Katoh et al. |
| 5,838,371 | A | * | 11/1998 | Hirose et al. ............. 348/240.2 |
| 6,683,643 | B1 | * | 1/2004 | Takayama et al. ............ 348/247 |
| 6,819,359 | B1 | * | 11/2004 | Oda ............................. 348/247 |
| 7,250,969 | B2 | * | 7/2007 | Sakurai et al. ............... 348/246 |

| | | |
|---|---|---|
| 2002/0015111 | A1 | 2/2002 Harada |

FOREIGN PATENT DOCUMENTS

| | | |
|---|---|---|
| EP | 0 313 278 | 4/1989 |
| EP | 1 178 671 A1 | 2/2002 |
| JP | 01-105672 | 4/1989 |
| JP | 03-296375 | 12/1991 |
| JP | 11-239298 | 8/1999 |

(Continued)

OTHER PUBLICATIONS

JPO Office Action, App. No. 2004-145945, Jul. 8, 2008 (3 pages).

(Continued)

*Primary Examiner*—Sinh Tran
*Assistant Examiner*—Tuan H Le
(74) *Attorney, Agent, or Firm*—Rader Fishman & Grauer PLLC; Ronald P. Kananen

(57) ABSTRACT

A signal detection circuit and a controller receive signals from an imaging device, determine pixels having signal levels that exceed a predetermined defect determination level as defective pixels, and store the addresses of the defective pixels corresponding to read methods. When the imaging device images an object, a defect compensation circuit reads the addresses of the defective pixels that have been stored corresponding to the read methods and performs a predetermined compensation process for the defective pixels. A controller stores the signal levels of the defective pixels and converts the signal levels corresponding to the read methods. As a result, when defective pixels are detected in one read method, the defective pixels can be compensated in a plurality of read methods.

14 Claims, 10 Drawing Sheets

FOREIGN PATENT DOCUMENTS

| | | |
|---|---|---|
| JP | 11-261899 A | 9/1999 |
| JP | 2000-201300 | 7/2000 |
| JP | 2000-224490 | 8/2000 |
| JP | 2001-292377 A | 10/2001 |
| JP | 2002-185857 A | 6/2002 |
| JP | 2003-046871 A | 2/2003 |
| JP | 2004-064623 | 2/2004 |

OTHER PUBLICATIONS

EPO Search Report Aug. 11, 2005.
European Search Report dated Feb. 14, 2008 for corresponding European Application No. Ep-08 00 0457.

* cited by examiner

131

132

IMAGING APPARATUS AND IMAGING METHODS

CROSS REFERENCES TO RELATED APPLICATIONS

The present invention contains subject matter related to Japanese Patent Application JP 2004-145945 filed in the Japanese Patent Office on May 17, 2004, the entire contents of which are incorporated herein by reference.

BACKGROUND OF THE INVENTION

1. Field of the Invention

The present invention relates to an imaging apparatus and an imaging method that detect defective pixels of an imaging device and compensate image signals of the defective pixels using the detected results.

2. Description of the Related Art

An imaging device that is mounted in an electronic camera or the like and that images an object may have pixel defects that took place at the production stage. These pixel defects output signals, the levels of which are abnormal. Thus, if an image is generated with an output signal of an imaging device that has pixel defects, erroneous information that is absent in the object is contained in the image. As a result, the image becomes unnatural.

Such defective pixels may take place due to various causes such as a dirk current and a defective photodiode. A defect of which an output level of a defective pixel is higher than that of a normal pixel is referred to as "white defect," whereas a defect of which an output level of a defective pixel is lower than that of a normal pixel is referred to as "black defect."

As a method in which such defects especially white defects are detected and compensated, pixels that are light shielded and whose output levels exceed a predetermined value are detected and the positions thereof are stored in a storage device (that is a random access memory (RAM) or a read only memory (ROM)). When an object is imaged, the positions of the white defects are read from the storage device. The defective pixels are interpolated with their surrounding pixels. When a normal pixel is light shielded, the output level thereof is ideally zero. Using the difference of characteristics of a normal pixel and a defective pixel, the output level of which is not zero, a defective pixel is detected and compensated. This method has been proposed in the following Patent Document 1 and Patent Document 2.

[Patent Document 1]
Japanese Patent No. 2,565,264 (Japanese Patent Laid-Open Publication No. HEI 1-105672)

[Patent Document 2]
Japanese Patent No. 2,808,814 (Japanese Patent Laid-Open Publication No. HEI 3-296375)

In this case, detecting a defective pixel is recognizing a defective pixel as a defective pixel. On the other hand, compensating a defective pixel is compensating an output signal of a defective pixel that has been detected by an image process so that the output signal of the defective pixel becomes close to the expected output signal thereof.

The signal level of a defective pixel as a white defect varies depending on the time after the pixel is exposed until the signal is read therefrom (hereinafter this time may be referred to as exposure-read time). The signal level of the pixel is proportional to the exposure-read time. When the exposure-read time is short, the white defect is not obstructive. By contrast, when the exposure-read time is long, the white defect becomes obstructive.

However, in the foregoing defect detection method of the related art, pixels that output signals whose levels are larger than a predetermined value are detected as defective pixels. Thus, in all pixels to be checked (namely, individual pixels on one screen), their exposure-read times should be the same. In other words, as described above, the signal levels of defective pixels as white defects increase as their exposure-read times become long.

For example, when the exposure-read times of pixels at a lower portion of the screen are long and the exposure-read times of pixels at an upper portion of the screen are short, the signal levels of white defects at the lower portion of the screen are higher than those at the upper portion of the screen. At this point, if defective pixels are detected with a predetermined threshold value, even if defective pixels as white defects are almost equally distributed at the upper and lower portions of the screen, more defective pixels are detected from the lower portion of the screen than the upper portion of the screen. Thus, defective pixels may not been properly detected.

OBJECTS AND SUMMARY OF THE INVENTION

In view of the foregoing, it would be desirable to provide an imaging apparatus and an imaging method of which the imaging apparatus uses a first read method in which the exposure-read time is the same in each pixel and a second read method in which the exposure-read time differs in each pixel group, has white defect determination levels that differ in the first and second read methods, and suitably compensates defects in the first and second read methods.

It would be also desirable to provide an imaging apparatus and an imaging method for which the imaging apparatus uses the first read method and the second read method, stores the signal levels of defective pixels, and compensates defective pixels in at least the two read method with one defect detection operation in one read method.

It would be further desirable to provide an imaging apparatus and an imaging method for which the imaging device uses the first read method and the second read method and compensates defective pixels in at least the two read methods with one defect detection operation in one read method without storing the signal levels of the defective pixels.

According to an embodiment of the present invention, there is provided an imaging apparatus, including an imaging device having a plurality of pixel groups each having at least one pixel; a signal detection device for reading stored electric charges from the pixels and outputting signals having signal levels corresponding to the amounts of stored electric charges that have been read; and a defect detection device for determining whether the pixels are defective pixels corresponding to the signal levels, wherein the pixels of the imaging device are controlled so that the storage electric charges are read from the pixels of the imaging device in at least a first read method and a second read method, wherein in the first read method, the stored electric charges are read from the pixels so that the electric charge storage time of each of the pixels is the same or different in each of the pixel groups, wherein in the second read method, the stored electric charges are read from the pixels so that the electric charge storage time of each of the pixels is different from the first read method in at least part of the pixel groups, and wherein the defect detection device sets defect determination levels for the read methods and determines pixels having signal levels larger than the defect determination levels as defective pixels.

According to another embodiment of the present invention, there is an imaging apparatus, including an imaging device having a plurality of pixel groups each having at least one pixel; a signal detection device for reading stored electric charges from the pixels and outputting signals having signal levels corresponding to the amounts of stored electric charges that have been read; a defect detection device for determining whether the pixels are defective pixels corresponding to the signal levels; a storage device; and a defect compensation device, wherein the pixels of the imaging device are controlled so that the storage electric charges are read from the pixels of the imaging device in at least a first read method and a second read method, wherein in the first read method, the stored electric charges are read from each of the pixels so that the electric charge storage time of each of the pixel groups is proportional to the distance of each of the pixel groups to a predetermined position of the imaging device with a first ratio, wherein in the second read method, the stored electric charges are read from each of the pixels so that the electric charge storage time of each of the pixel groups is proportional to the distance of each of the pixel groups to the predetermined position of the imaging device with a second ratio that is different from the first ratio, wherein the defect detection device sets defect determination levels for the pixel groups in one read method selected from the first read method and the second read method, determines pixels having signal levels larger than the defect determination levels as defective pixels, and stores the addresses of the defective pixels of the imaging device and the signal levels of the defective pixels to the storage device, and wherein when the defect compensation device compensates defective pixels in the other read method, the defect compensation device obtains the distances of the defective pixels from the predetermined position of the imaging device with the addresses of the defective pixels stored in the storage device, obtains converted signal levels of the defective pixels with the signal levels of the defective pixels stored in the storage device, the calculated distances, the first ratio, and the second ratio, compares the converted signal levels with the defect determination levels, and determines whether to compensate the defective pixels.

According to another embodiment of the present invention, there is an imaging apparatus, including an imaging device having a plurality of pixel groups each having at least one pixel; a signal detection device for reading stored electric charges from the pixels and outputting signals having signal levels corresponding to the amounts of stored electric charges that have been read; and a defect detection device for determining whether the pixels are defective pixels corresponding to the signal levels, wherein the pixels of the imaging device are controlled so that the storage electric charges are read from the pixels of the imaging device in at least a first read method and a second read method, wherein in the first read method, the stored electric charges are read from each of the pixels so that the electric charge storage time of each of the pixel groups is proportional to the distance of each of the pixel groups to a predetermined position of the imaging device with a first ratio, wherein in the second read method, the stored electric charges are read from each of the pixels so that the electric charge storage time of each of the pixel groups is proportional to the distance of each of the pixel groups to the predetermined position of the imaging device with a second ratio that is different from the first ratio, wherein the defect detection device sets defect determination levels for the pixel groups in one read method selected from the first read method and the second read method, and determines pixels having signal levels larger than the defect determination levels as defective pixels, and wherein the defect determination levels are set so that they are proportional to the distance to the predetermined position of the imaging device with a ratio between the first ratio and the second ratio.

According to another embodiment of the present invention, there is an imaging method, including the steps of reading stored electric charges from pixels of an imaging device having a plurality of pixel groups each having at least one pixel and outputting signals having signal levels corresponding to the amounts of stored electric charges that have been read; and determining whether the pixels are defective pixels corresponding to the signal levels, wherein the pixels of the imaging device are controlled so that the storage electric charges are read from the pixels of the imaging device in at least a first read method and a second read method, wherein in the first read method, the stored electric charges are read from the pixels so that the electric charge storage time of each of the pixels is the same or different in each of the pixel groups, wherein in the second read method, the stored electric charges are read from the pixels so that the electric charge storage time of each of the pixels is different from the first read method in at least part of the pixel groups, and wherein the defect detection step is performed by setting defect determination levels for the read methods and determining pixels having signal levels larger than the defect determination levels as defective pixels.

It is preferred that the defect detection step be performed by storing the addresses of the defective pixels of the imaging device to a predetermined storage device.

The imaging method may further includes the step of compensating signals of the defective pixels, wherein the defect compensation step is performed by obtaining the addresses of the defective pixels from is the storage device corresponding to a predetermined read method so as to identify pixels to be compensated.

It is preferred that the imaging device be light shielded for a predetermined period of the electric charge storage time.

According to another embodiment of the present invention, there is an imaging method, including the steps of reading stored electric charges from pixels of an imaging device having a plurality of pixel groups each having at least one pixel and outputting signals having signal levels corresponding to the amounts of stored electric charges that have been read; determining whether the pixels are defective pixels corresponding to the signal levels; and compensating the defective pixels, wherein the pixels of the imaging device are controlled so that the storage electric charges are read from the pixels of the imaging device in at least a first read method and a second read method, wherein in the first read method, the stored electric charges are read from each of the pixels so that the electric charge storage time of each of the pixel groups is proportional to the distance of each of the pixel groups to a predetermined position of the imaging device with a first ratio, wherein in the second read method, the stored electric charges are read from each of the pixels so that the electric charge storage time of each of the pixel groups is proportional to the distance of each of the pixel groups to the predetermined position of the imaging device with a second ratio that is different from the first ratio, wherein the defect detection step is performed by setting defect determination levels for the pixel groups in one read method selected from the first read method and the second read method, determining pixels having signal levels larger than the defect determination levels as defective pixels, and storing the addresses of the defective pixels of the imaging device and the signal levels of the defective pixels to a storage device, and wherein to compensate defective pixels in the other read method, the defect compensation step is performed by obtaining the distances of the defective pixels from the predetermined position of the imaging device with the addresses of the defective pixels stored in the storage device, obtaining converted signal levels of the defective pixels with the signal levels of the defective pixels stored in the storage device, the calculated distances, the first ratio, and the second ratio, comparing the converted signal levels with the defect determination levels, and determining whether to compensate the defective pixels.

It is preferred that each of the pixel groups be composed of pixels corresponding to one line of the imaging device, wherein in the first read method, the stored electric charges are read from the pixels so that the electric charge storage time of each of pixels of the pixel groups is the same, wherein in the second read method, the stored electric charges are read from the pixels so that the electric charge storage time is different in each of the pixel groups, the electric charge storage time of each of the pixels being proportional to the distance of each of the pixel groups to the top of the imaging device, and wherein the defect determination level of each of the pixel groups is the same.

It is preferred that the predetermined position of the imaging device be the first line of the imaging device.

It is preferred that the imaging device be light shielded for a predetermined period of the electric charge storage time.

According to another embodiment of the present invention, there is an imaging method, including the steps of reading stored electric charges from pixels of an imaging device having a plurality of pixel groups each having at least one pixel and outputting signals having signal levels corresponding to the amounts of stored electric charges that have been read; and determining whether the pixels are defective pixels corresponding to the signal levels, wherein the pixels of the imaging device are controlled so that the storage electric charges are read from the pixels of the imaging device in at least a first read method and a second read method, wherein in the first read method, the stored electric charges are read from each of the pixels so that the electric charge storage time of each of the pixel groups is proportional to the distance of each of the pixel groups to a predetermined position of the imaging device with a first ratio, wherein in the second read method, the stored electric charges are read from each of the pixels so that the electric charge storage time of each of the pixel groups is proportional to the distance of each of the pixel groups to the predetermined position of the imaging device with a second ratio that is different from the first ratio, wherein the defect detection step is performed by setting defect determination levels for the pixel groups in one read method selected from the first read method and the second read method, and determining pixels having signal levels larger than the defect determination levels as defective pixels, and wherein the defect determination levels are set so that they are proportional to the distance to the predetermined position of the imaging device with a ratio between the first ratio and the second ratio.

It is preferred that the defect detection step be performed by storing the addresses of the defective pixels of the imaging device to a storage device.

It is preferred that the imaging method further include the step of compensating signals of the defective pixels, wherein the defect compensation step is performed by obtaining the addresses of the defective pixels from the storage device so as to identify pixels to be compensated.

It is preferred that each of the pixel groups be composed of pixels corresponding to one line of the imaging device, wherein in the first read method, the stored electric charges are read from the pixels so that the electric charge storage time of each of pixels of the pixel groups is the same, and wherein in the second read method, the stored electric charges are read from the pixels so that the electric charge storage time is different in each of the pixel groups, the electric charge storage time of each of the pixels being proportional to the distance of each of the pixel groups to the top of the imaging device.

It is preferred that the predetermined position of the imaging device be the first line of the imaging device.

It is preferred that the imaging device be light shielded for a predetermined period of the electric charge storage time.

According to an embodiment of the present invention, the imaging apparatus that uses the first read method in which the exposure-read time is the same in each pixel and the second read method in which the exposure-read time differs in each pixel group can compensate defective pixels in each of the read methods. When the imaging apparatus stores the signal levels of the defective pixels, the apparatus can compensate the defective pixels in at least the two read methods with one defect detection operation in one of the read methods. Even if the imaging apparatus does not store the signal levels of the defective pixels, when the apparatus uses a defect determination level between that in the first read method and that in the second read method, the apparatus can compensate the defective pixels in at least the two read methods with one defect detection operation in one of the read methods.

These and other objects, features and advantages of the present invention will become more apparent in light of the following detailed description of a best mode embodiment thereof, as illustrated in the accompanying drawings.

BRIEF DESCRIPTION OF THE DRAWINGS

The invention will become more fully understood from the following detailed description, taken in conjunction with the accompanying drawings, wherein similar reference numerals denote similar elements, in which.

DETAILED DESCRIPTION OF THE PREFERRED EMBODIMENTS

First of all, a problem that takes place in detection of white defects in the related art will be described in detail. In the defect detection method of the related art, the output signal of each pixel is compared with a predetermined defect determination level so as to determine whether each pixel is defective. The defect determination level is one value for one screen. Pixels in one screen are determined in accordance with the defect determination level. However, since read timings of signals from pixels may differ in some types of imaging devices, the signal levels of defective pixels as white defects may differ.

Figure 1:
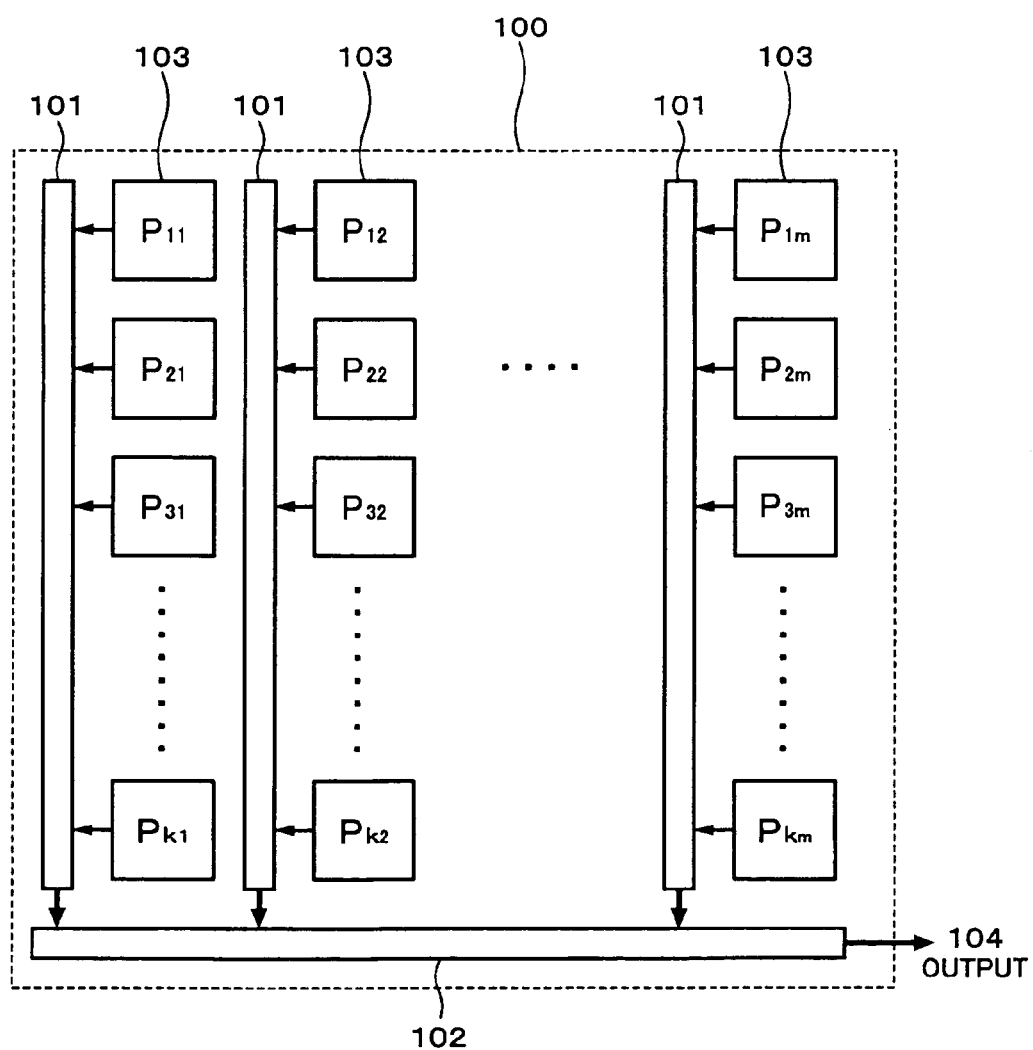
FIG. 1 is a schematic diagram describing a structure of a CCD and transfer of electric charges stored therein.

In a charge-coupled device (CCD) 100 shown in FIG. 1 that is used as an imaging device, when electric charges stored in pixels 103 to which light is emitted are read, the electric charges of the pixels 103 are transferred to a V transfer register 101 connected to the pixels 103. Electric charges of pixels 103 as a set of P11 to Pk1 are transferred to a V transfer register 101 disposed at the left end of the CCD 100. Thereafter, the electric charges are successively transferred to an H transfer register 102. Output signals of the pixels 103 are obtained as an output 104 from the H transfer register 102. In other words, in this read method, electric charges of all the pixels 103 are read at the same timing. The times for which electric charges are stored in the pixels 103 are the same.

Figure 2:
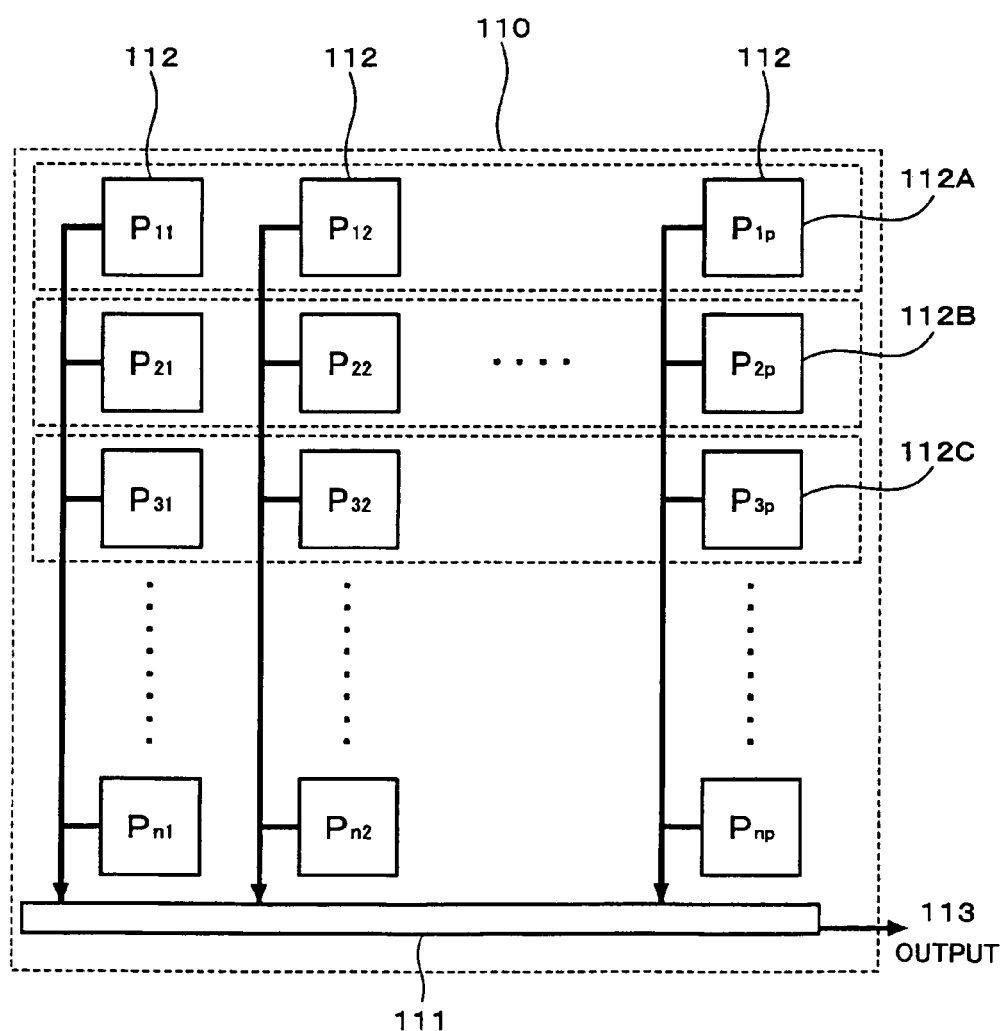
FIG. 2 is a schematic diagram describing a structure of a CMOS and transfer of electric charges stored therein.

On the other hand, in an imaging device that uses a complementary metal-oxide semiconductor (CMOS) 110 as shown in FIG. 2, since it does not have a V transfer registers 101 shown in FIG. 1, when electric charges are read from pixels 112, output signals of the pixels 112 of each line are transferred to a column 111. The column 111 substantially accomplishes the function of the H transfer registers 102 shown in FIG. 1. One line is for example a pixel group 112A composed of pixels P11, P12, . . . , and P1p. Normally, a set of pixels is a pixel group. However, in this specification, one pixel may be also called a pixel group.

First, output signals of a pixel group 112A as a first line are transferred to the column 111 at the same timing. A signal of the column 111 is output as an output 113. When the column 111 becomes empty, output signals of a pixel group 112B as a second line are transferred to the column 111 at the next timing. When the column 111 becomes empty, output signals of a pixel group 111C as a third line are transferred to the column 111 at the next timing. By repeating these processes, output signals of all the pixels 112 are output as an output 113.

When the exposure start times of all the pixels 112 are the same, electric charge storage times of pixels differ in each line. In addition, as described above, the output signal level of a defective pixel as a white defect is almost proportional to the electric charge storage time. Thus, when defective pixels whose growth ratios are different are determined with one defect determination level, they may not be accurately determined.

Figure 3:
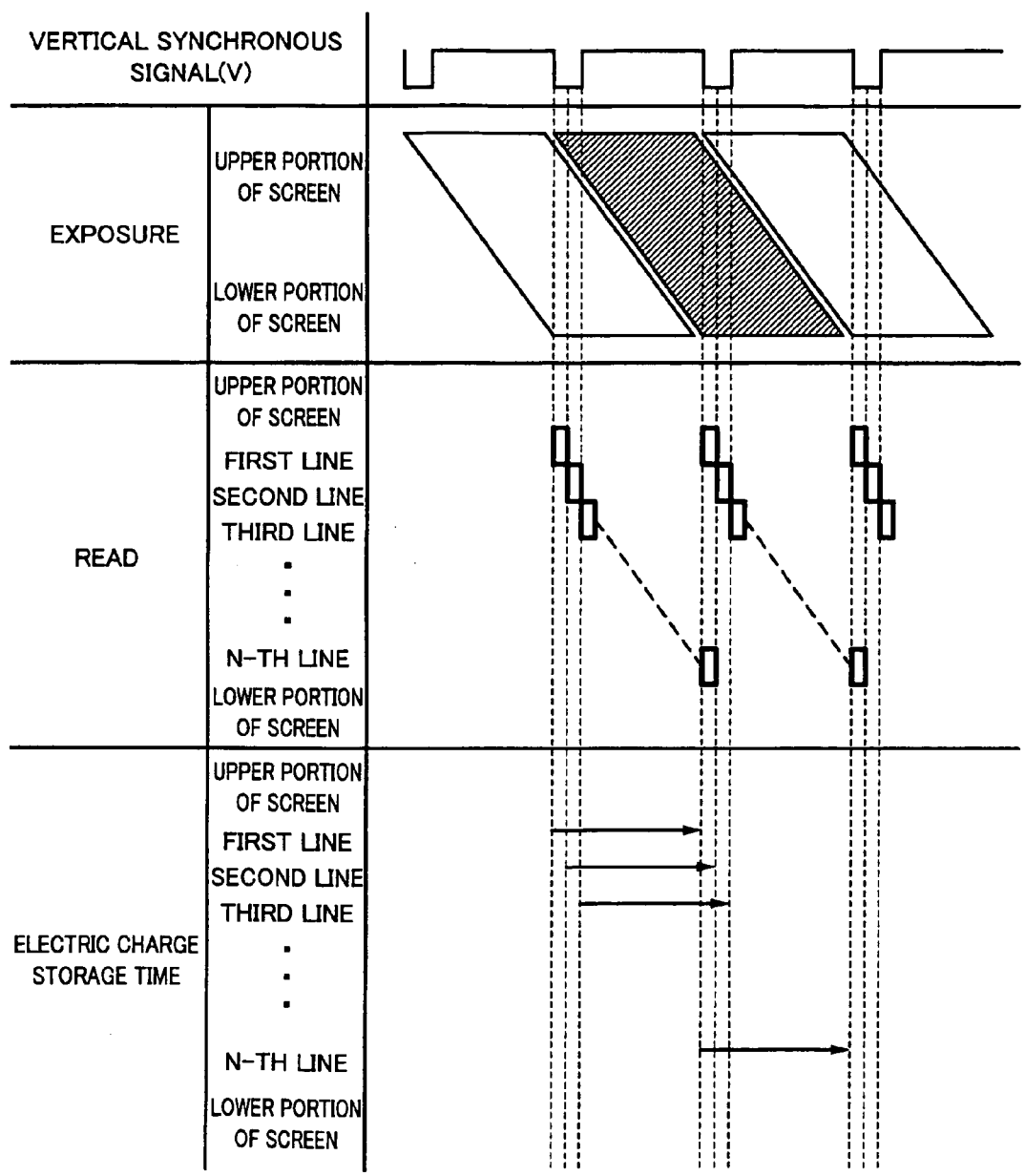
FIG. 3 is a schematic diagram showing exposure and read timings in a read method of a rolling shutter.

Next, the relationship between imaging modes and electric charge storage times of pixels will be described. Electronic cameras of some types have a moving image mode and a still image mode. In these modes, the electronic cameras perform different read operations. FIG. 3 shows exposure and read timings in the moving image mode.

In the moving image mode, an image signal needs to be read from an imaging device at intervals of 1/60 seconds (every vertical synchronous signal) in accordance with the TV format. Thus, the read operation for each pixel is performed at timing corresponding to the vertical synchronous signal as shown in FIG. 3. The read operation is performed for each line from the top to the bottom of the screen. When the read operation is completed, the exposure operation is started. As a result, as shown in the bottom portion of FIG. 3, the exposure-read times of pixels on the screen are the same.

As described above, in an imaging device using a CMOS or the like, the read timings are different in pixel groups. When the exposure start timings of all pixels are the same, the growth ratios of defective pixels differ. As a result, defective pixels may not be correctly determined. However, in the read operation as shown in FIG. 3, as the read timings deviate, the exposure start timings deviate. Thus, although the read timings differ in pixel groups (lines), the exposure-read times after pixels are exposed (times for which electric charges stored in pixels are reset) until electric charges are read therefrom are the same. In other words, the growth ratios (defect levels) of white defects are the same in the moving image mode. Thus, the imaging device using the CMOS can be treated in the same manner as the imaging device using the CCD described in FIG. 1.

On the other hand, in the still image mode, it is not necessary to read an image signal from the imaging device in accordance with the TV format. Thus, the image signal can be read at a relatively low speed.

Figure 4A:
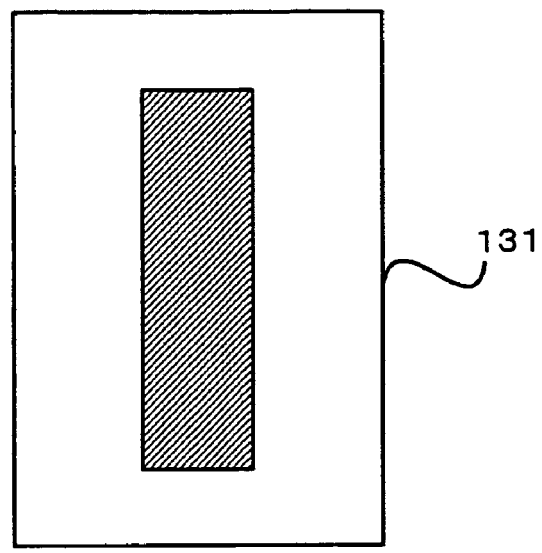
FIG. 4A and FIG. 4B are schematic diagrams showing distortion of an image that takes place due to deviation of exposure timings of upper and lower portions of a screen in a moving image mode.
Figure 4A:
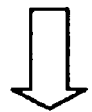

In the moving image mode, since the exposure timings of the upper portion and the lower portion of the screen deviate (namely, although their electric charge storage times are the same, their storage timings are different), when a moving object is imaged, the upper portion and the lower portion of the screen distort. For example, when a rod is imaged while the camera is being panned or when a moving rod is imaged, although the rod should be imaged as an image 131 shown in FIG. 4A, due to the difference of the timings, the rod will be imaged as an image 132 shown in FIG. 4B. However, in the moving image mode, since the frame rate is 1/60 seconds, unless an object that moves at very high speed is imaged or the camera is panned at very high speed, a practical problem does not take place in the obtained image.

Figure 4B:
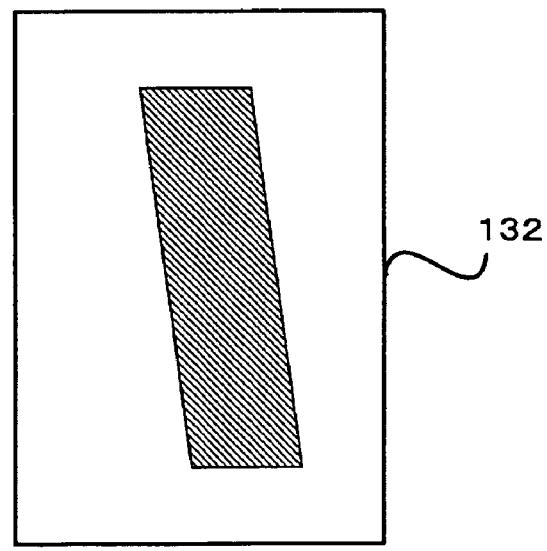
Figure 5:
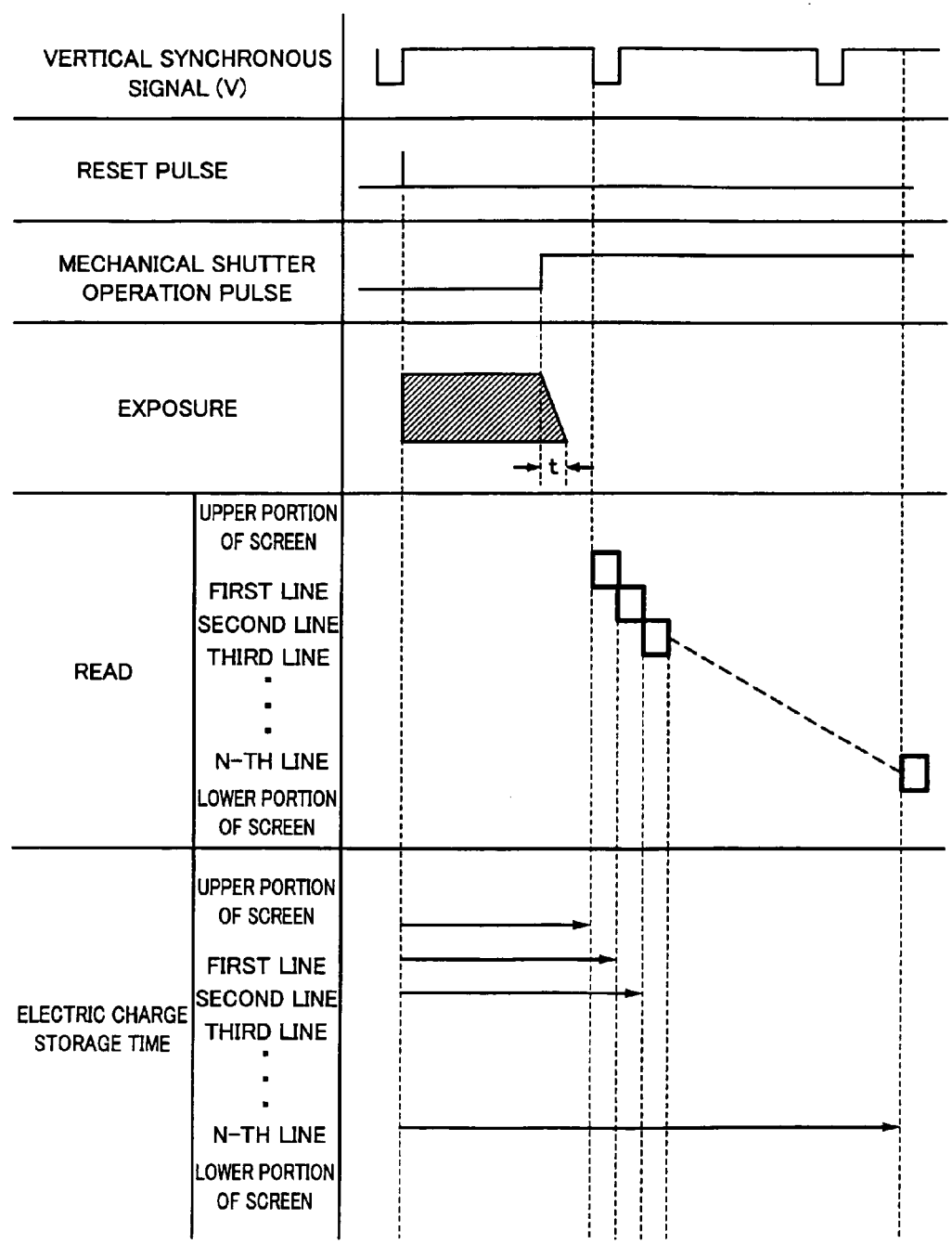
FIG. 5 is a schematic diagram showing exposure and read timings in a read method of a global shutter.

By contrast, when a still object is imaged, since a rod adversely appears to be oblique as shown in FIG. 4B, it is necessary to change the read method for the image. To solve this problem, when the still object is imaged, it is preferred to read an image signal as shown in FIG. 5. When the exposure operation is started, if a reset pulse is supplied, electric charges are discharged from all the pixels. This operation starts exposing all the pixels from this position and starts storing electric charges to the pixels at the same timing. After predetermined amounts of electric charges are stored in the pixels, a light shield device is disposed in the optical axis. As a result, the imaging device is light shielded and it is no more exposed. Thus, electric charges (light) are stored in all the pixels at the same timings. As a result, the upper portion and the lower portion of the image do not distort.

In addition, as shown in FIG. 5, in this example, the light shield device starts the shielding operation at a timing at which the mechanical shutter operation pulse is turned on. After time t has elapsed, the light shield device completely shields light. Immediately after the light has been shielded, the image signal is read. However, since the read operation is successively performed for each pixel group, the read start timings differ in the pixel groups (lines). Thus, the growth ratios of pixel defects (defect levels) differ in the pixel groups. In the case shown in FIG. 5, the signal levels of defective pixels at the upper portion of the screen are low. The signal level of a defective pixel is reversely proportional to the distance to the lowest line of the screen.

Thus, the imaging device performs the read operation for pixel groups (lines) at different timings in both the moving image mode and the still image mode. In the moving image mode, the exposure start timings (at which electric charges of pixels are reset) for defective pixels deviate corresponding to the read timings thereof. However, in the still image mode, the exposure start timings for defective pixels are the same. Thus, in the still image mode, the signal level of a defective pixel at the upper portion of the screen is different from that at the lower portion of the screen. In addition, in the still image mode, with the light shield device, the substantial exposure time of a defective pixel at the upper portion of the screen is almost the same as that of a defective pixel at the lower portion of the screen. However, the signal levels of defective pixels depend on the times after they are exposed until their signals are finally read.

In the imaging device of the embodiment of the present invention, defective pixels are controlled by correlating the defect determination levels and the positions of pixels on the screen. As a result, the foregoing problem is solved or lightened.

Figure 6:
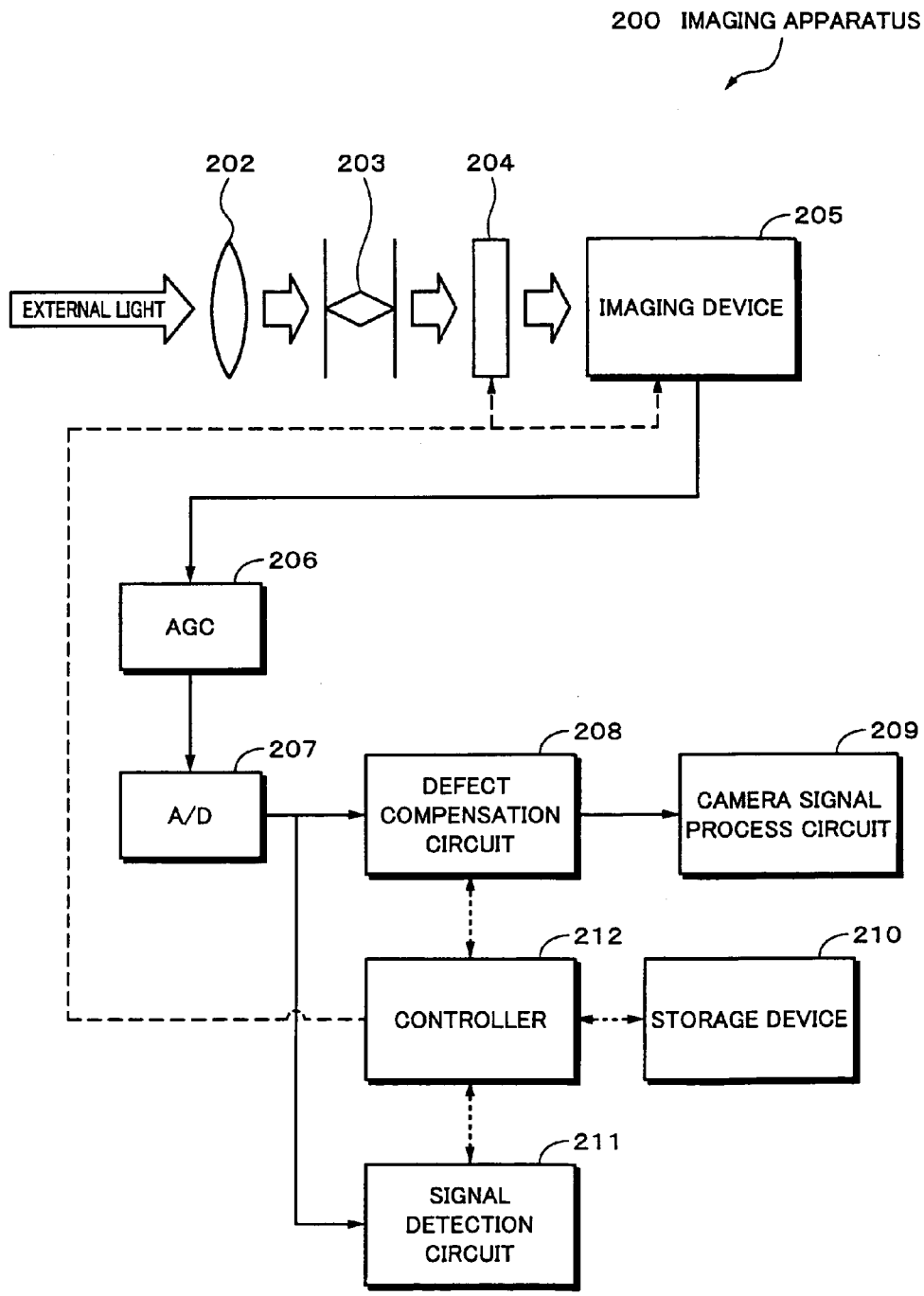
FIG. 6 is a block diagram showing a structure of an imaging apparatus according to a first embodiment of the present invention.

Next, with reference to FIG. 6, the imaging apparatus according to the embodiment of the present invention will be described. The imaging apparatus is used as, for example, an electronic camera. FIG. 6 shows an imaging apparatus 200 according to a first embodiment of the present invention. The imaging apparatus of the embodiment of the present invention can be used in various imaging systems. The imaging apparatus 200 has a lens 202, an iris 203, a light shield device 204, an imaging device 205, an auto gain control (AGC) 206, an analog-to-digital (A/D) conversion device 207, a defect compensation circuit 208, a camera signal process circuit 209, a storage device 210, a signal detection circuit 211, and a controller 212.

In FIG. 6, solid lines that connect structural devices represent a flow of image data. Dotted lines represent control signals that control structural devices or a flow of information about defective pixels.

The lens 202 focuses external light on the imaging device 205. The iris 203 controls incident light of the imaging device 205. The light shield device 204 is used, for example, to image a still image. When the mechanical shutter operation pulse is turned on, the light shield device 204 starts a light shield operation that causes the incident light to the imaging device 205 to be completely shielded. The imaging device 205 is composed of an array of a plurality of pixels that convert light into electric signals. The AGC 206 electrically amplifies an output of the imaging device 205. The A/D conversion device 207 converts the amplified analog signal that is output from the imaging device 205 into a digital signal.

Thereafter, the digital signal is supplied to the signal detection circuit 211 that detects the levels of the output signals of the pixels. The signal levels of the pixels detected by the signal detection circuit 211 are supplied to the controller 212. The controller 212 compares the signal levels with defect determination levels or the like and determines defective pixels. When the controller 212 has determined the defective pixels, the controller 212 stores their positions to the storage device 210 such as a ROM or an RAM.

When the defect compensation circuit 208 receives the digital signal imaged by the imaging device 205, the defect compensation circuit 208 obtains position information of defective pixels from the storage device 210 through the controller 212. The defect compensation circuit 208 compensates the defective pixels in accordance with the obtained position information. The camera signal process circuit 209 performs signal processes such as white balance, gamma compensation, luminance (Y)-chromatic (C) separation, and so forth for an image that has been defect compensated by the defect compensation circuit 208.

The controller 212 generates a control signal to control the operations of the light shield device 204 and the imaging device 205. The controller 212 supplies the mechanical shutter operation pulse to the light shield device 204 to control timing of the light shield operation thereof. Likewise, the controller 212 supplies a reset pulse to the imaging device to control the exposure start timing and so forth.

Both the signal detection circuit 211 and the defect compensation circuit 208 input image data obtained by the imaging device 205. However, the signal detection circuit 211 inputs a full black image to detect white defects. On the other hand, the defect compensation circuit 208 inputs an image that the user imaged.

In this example, the controller 212 determines defective pixels and stores their position information to the storage device 210. However, the signal detection circuit 211 and the defect compensation circuit 208 can be structured to perform these functions. The structure shown in FIG. 6 is only an example. Alternatively, pixel defects can be detected and compensated by many other structures. A practical operation of the imaging apparatus 200 will be described later.

Here, a device that detects white defects of pixels will be described in detail along with the theory based thereon. A defective pixel as a white defect is detected by placing the light shield device 204 shown in FIG. 6 on the optical axis of the lens 202 so as to completely shield incident light to the imaging device 205. Thus, the levels of image signals (output signals of pixels of the imaging device 205) become zero (namely, black). At this point, although the signal levels of pixels may not become zero due to weak electric noise, since they are very small, they can be considered to be zero.

However, when the imaging device 205 has defective pixels as white defects, the levels of the output signals of the pixels exceed a predetermined value. Since defective pixels are broken due to any cause, the pixels are difficult to output signals having a normal value unlike the other normal pixels. When a defective pixel is detected in the related art, a predetermined defect determination level is provided. A pixel whose output level exceeds the defect determination level is determined to be a defective pixel as a white defect. The address of the pixel determined to be a defective pixel as a white defect is stored. A compensation process is performed for the defective pixel. The compensation process is a process that generates an output signal (pixel data) of a defective pixel with the average value of signal levels of normal pixels surrounding the defective pixel.

Hereinafter, a method that is used in a normal moving image mode as shown in FIG. 3, namely a read method in which the exposure start timings deviate in pixel groups, the read timings deviate corresponding to the exposure start timings, and the electric charge storage times of the pixel groups are the same is referred to as "rolling shutter." On the other hand, a method that is used in the still image mode as shown in FIG. 5, namely a read method in which, although the exposure start timings of pixel groups are the same, since the read timings deviate, the electric charge storage times differ in the pixel groups is referred to as "global shutter."

Next, it is assumed that an electronic camera that has a plurality of read methods (for example, rolling shutter and global shutter) detects defective pixels at power-on. In this case, when the electronic camera detects defective pixels with the rolling shutter and then images a still image, since the electronic camera images the still image with the global shutter, the influence of a defective pixel at the upper portion of the screen is different from that at the lower portion of the screen. In particular, a defective pixel at the upper portion or the lower portion of the screen is difficult to be properly compensated.

Conversely, when the electronic camera detects defective pixels with the global shutter at power-on and images a moving object, since the electronic camera images the moving object with the rolling shutter, the electronic camera is difficult to properly compensate a defective pixel at the upper portion or lower portion of the screen.

Thus, in the imaging apparatus according to the first embodiment of the present invention, the electronic camera has a plurality of read methods. When the exposure-read times of the pixel groups are the same in the first read method and the exposure-read times of the pixel groups are different in the second read method, the electronic camera detects defective pixels in each of the read methods and stores the detected results to the storage device.

Such defective pixels may have been detected at shipment. In this case, at first, the electronic camera may have detected defective pixels with the global shutter and stored the addresses of the detected defective pixels to a predetermined region of the storage device. Thereafter, the electronic camera may have detected defective pixels with the rolling shutter and stored the addresses of the detected defective pixels to another region of the storage device. When the user actually uses the electronic camera, it reads the addresses of the defective pixels from the storage device and compensates the defective pixels.

Alternatively, the electronic camera may detect defective pixels at power-on. In this case, when the user switches the mode of the electronic camera, it detects defective pixels in the switched read mode. When the user intends to image a moving object and select the moving image mode, the electronic camera detects defective pixels with the rolling shutter and stores the addresses of the detected defective pixels to the predetermined region of the storage device. When the user intends to image a still image and select the still image mode, the electronic camera detects defective pixels with the global shutter and stores the addresses of the detected defective pixels to the predetermined region of the storage device. This structure allows defective pixels to be properly compensated in each mode.

When the electronic camera detects defective pixels at power-on, the storage capacity of the storage device can be around half as small as when it has detected them at shipment. In addition, when the electronic camera detects defective pixels at power-on, it can deal with them after shipment.

Next, the operations of the structural devices of the imaging apparatus according to the first embodiment of the present invention will be described. The signal detection circuit 211 shown in FIG. 6 receives image signals that have been digitized by the A/D conversion device 207 and detects signal levels of the pixels. When defective pixels are detected, since a full black signal is input, the signal levels of the pixels ideally become zero. Thereafter, the signal levels of the pixels are supplied to the controller 212. The controller 212 determines pixels that have signal levels exceeding predetermined defect determination levels to be defective pixels. The addresses of defective pixels, the addresses representing the positions determined to be defective pixels (on the screen) are stored to the storage device 210 by the controller 212. The addresses represent the positions of pixels in the imaging device. The addresses can be identified by two-dimensional values that represent rows and columns of the array of the imaging device or unique numbers or sequence numbers on the screen. In addition, defective pixels can be detected at timing the user designates as well as at shipment and at power-on.

The controller 212 controls the signal detection circuit 211 to detect defective pixels with, for example, the global shutter and the rolling shutter and stores the addresses of the detected defective pixels to respective regions of the storage device 210. When there are defective pixels that have been detected with both the global shutter and the rolling shutter, the controller 212 stores the defective pixels to a common region of the storage device so as to decrease the storage capacity of the storage device 210.

The compensation process is performed by the defect compensation circuit 208. When the user images an object with the rolling shutter (normally, the moving image mode), the defect compensation circuit 208 receives image signals imaged by the imaging device 205 and digitized by the A/D conversion device 207, reads the addresses of defective pixels determined with the rolling shutter from the storage device 210 through the controller 212, and performs a predetermined compensation process for the signals of the pixels corresponding to the addresses. On the other hand, when the user images an object with the global shutter (normally, the moving image mode), the defect compensation circuit 208 receives image signals imaged by the imaging device 205 and digitized by the A/D conversion device 207, reads the addresses of defective pixels determined with the global shutter from the storage device 210 through the controller 212, and performs a predetermined compensation process for the signals of the pixels corresponding to the addresses.

The controller 212 is composed of a microcomputer that has a central processing unit (CPU) and memories such as a RAM and a ROM. The CPU in the controller 212 controls the operations of the defect compensation circuit 208 and the signal detection circuit 211 in accordance with commands of a program stored in the memory. When the signal detection circuit 211 detects defective pixels with the rolling shutter, the controller 212 supplies the foregoing defect determination levels suitably for defective pixels to the signal detection circuit 211. The program has been written to the ROM or read from a record device such as a hard disk to the memory. Alternatively, the program may be downloaded from an external computer to the memory through an external terminal such as the USB and a network such as the Internet.

In the foregoing example, the imaging apparatus can be applied to both the two read methods with the rolling shutter and the global shutter. Alternatively, the imaging apparatus of the embodiment of the present invention may be applied to three or more read methods. In this case, in the first read method, the electric charge storage times of pixels are the same or different in each pixel group. In the second read method, the electric charge storage times of at least part of pixels are different from those in the first read method. In the third read method, the electric charge storage times of at least part of pixels are different from those in the first and second read methods. The storage device 210 stores identification of a read method and addresses of defective pixels.

Next, an imaging apparatus according to a second embodiment of the present invention will be described. The imaging apparatus of the first embodiment detects defective pixels in each read method and compensate the defective pixels with the detected results that have been stored. By contrast, the imaging apparatus of the second embodiment detects defective pixels in one read method and compensates the defective pixels in a plurality of read methods with the detected results. Thus, when the imaging apparatus of the second embodiment detects defective pixels in one read method, the imaging apparatus stores the addresses of the defective pixels and correlatively stores the signal levels of the defective pixels and the addresses of the defective pixels.

Next, it is considered that the detected results of defective pixels detected with the global shutter are used to compensate defective pixels detected with the global shutter and the rolling shutter. It is assumed that signal levels of pixels for a full black object are plotted as a graph shown in FIG. 7A. In FIG.

7A, the vertical axis and the horizontal axis of the graph represent signal levels of pixels (amounts of stored electric charges) and the distances of pixels from the upper portion of the imaging device array (namely, the screen), respectively. Pixels denoted by letters "A" to "I" are sampled from the screen. The distance on the horizontal axis of the graph is proportional to the distance from the upper portion of the screen. Thus, the pixel "A" is at the top position of the screen, whereas the pixel "I" is at the bottom position of the screen.

In addition, it is assumed that the signal level of each pixel is obtained in the same electric charge storage time. When a full black object is imaged, the signal level of each pixel is ideally zero. In this example, for convenience, it is assumed that pixels have predetermined levels, other than zero, of due to defects or noise.

Figure 7A:
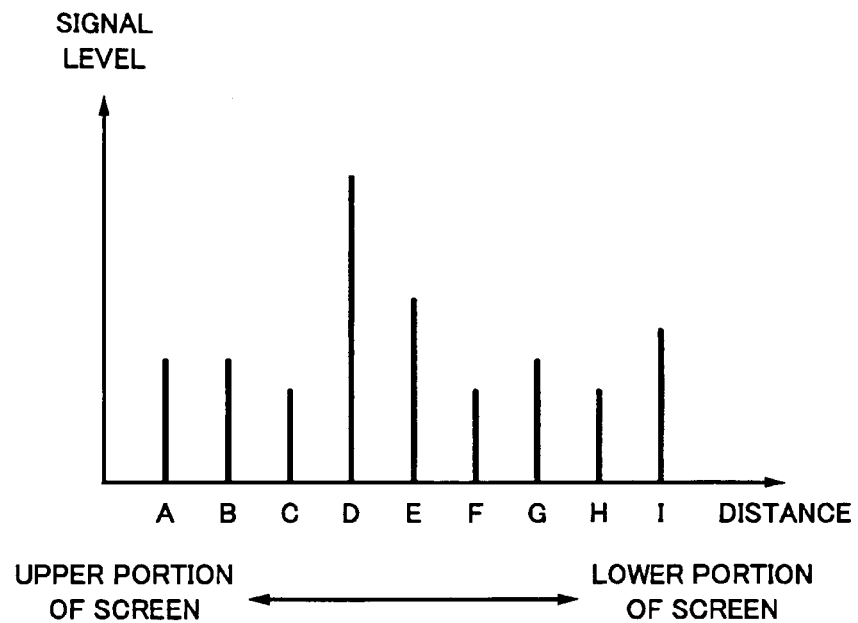
FIG. 7A and FIG. 7B are graphs showing signal levels of pixels.
Figure 7B:
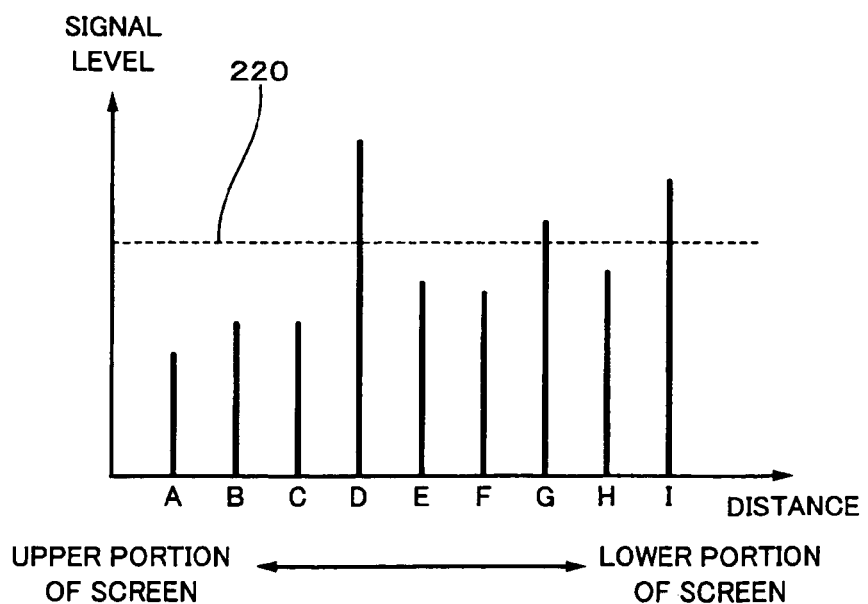

When the electronic camera images an object with the global shutter in the condition as shown in FIG. 7A, the electronic camera can obtain signal levels of a graph shown in FIG. 7B. The vertical axis and the horizontal axis of the graph of FIG. 7B are the same as those of the graph shown in FIG. 7A. FIG. 7B shows signal levels of the same pixels as those shown in FIG. 7A. As described above, the signal level of a pixel with the global shutter is proportional to the distance on the horizontal axis of the graph. Thus, in FIG. 7A, the signal level of the pixel "A" is larger than the signal level of the pixel "C." However, in FIG. 7B, the relationship of the signal levels of these pixels is inverted.

In FIG. 7B, the predetermined signal level is represented with a defect determination level indication line 220. When a pixel having a signal level that exceeds the defect determination level indication line 220 is determined as a defective pixel, the pixels "D," "G," and "I" are detected as defective pixels. The predetermined signal level is referred to as a defect determination level.

Figure 8:
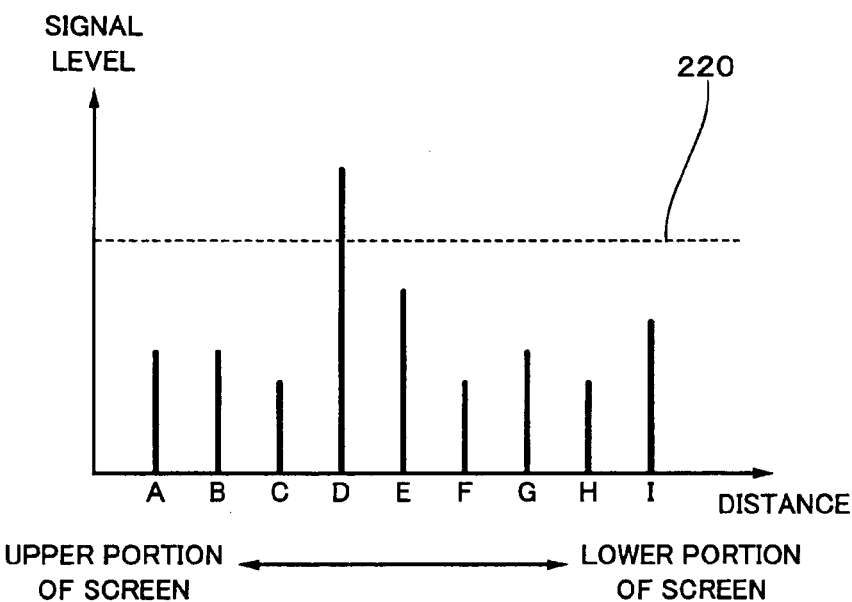
FIG. 8 is a graph showing signal levels of pixels.

When the electronic camera images an object with the rolling shutter in the condition as shown in FIG. 7A, signal levels of a graph shown in FIG. 8 are obtained. The vertical axis and the horizontal axis of FIG. 8 are the same as those of FIG. 7A. FIG. 8 shows signal levels of the same pixels as those shown in FIG. 7A. As described above, since the exposure-read start times of pixel groups are the same with the rolling shutter, the signal levels of the pixels are almost the same as those shown in FIG. 7A (since the electric charge storage timings of the pixels are not the same with the rolling shutter, the signal levels shown in FIG. 8 are not always the same as those shown in FIG. 7A). In other words, the signal level of a pixel at the lower portion of the screen does not increase.

In this case, when a defective pixel is determined with the defect determination level indication line 220 shown in FIG. 7B, only the pixel "D" is detected as a defective pixel. Thus, when the rolling shutter is used, it is not necessary to determine the pixels "G" and "I" as defective pixels.

Thus, when defective pixels detected with the rolling shutter are compensated with the determined results of defective pixels detected with the global shutter, the pixels "G" and "I" that are not defective pixels are compensated. As a result, information of non-defective pixels that provide proper signals are lost.

Figure 9:
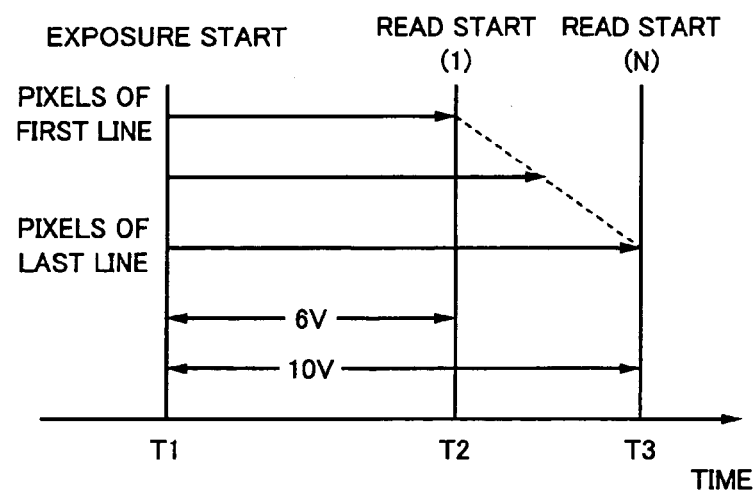
FIG. 9 is a schematic diagram showing the relationship between exposure-read start times and the positions of pixels in the read method of the global shutter.

Next, with reference to FIG. 9, when the global shutter is used, the exposure-read start time that varies depending on the position of a pixel will be described. Pixels at the top portion of the imaging device array, namely pixels on the first line of the screen, are exposed after exposure start timing T1 and signals are read therefrom at read start (1) timing T2. On the other hand, pixels at the bottom portion of the imaging device array, namely pixels on the last line of the screen, are exposed after exposure start timing T1 and their signals are read after the read start (N) timing T3.

When the exposure-read start time (namely, electric charge storage time) of a pixel on the first line and that of a pixel on the last line are compared, it is clear that the electric charge storage time of a pixel on the last line is larger than that of a pixel on the first line by T3−T2. The electric charge storage time of a pixel on the first line is T2−T1, whereas the electric charge storage time of a pixel on the last line is T3−T1. The electric charge storage time of each pixel almost linearly increases from the first line to the last line for T2−T1 to T3−T1.

In this example, time T2−T1 is 6 V and time T3−T1 is 10 V (where V is 1/60 seconds). In addition, as described above, the signal level of a defective pixel is proportional to the electric charge storage time. Thus, even if the signal level of a pixel on the last line of the screen is substantially the same as that of a pixel on the first line, the detected signal level is expressed as the signal level of a pixel on the first line×1.66 (10 V/6 V). Likewise, the signal level of a pixel on the middle line of the screen is represented as the signal level of a pixel on the first line×1.33 (8 V/6 V).

Thus, when defective pixels detected with the rolling shutter are compensated with the detected result of defective pixels detected with the global shutter, the signal level of each defective pixel is obtained assuming that it is on the first line of the screen based on the signal level of the pixel and the position (line) on the screen. Thereafter, the obtained signal level is compared with the predetermined defect determination level.

For example, when the defect determination level represented by the defect determination level indication line 220 shown in FIG. 7B is 40 and the detected signal level of the pixel "I" is 47, the signal level of the pixel "I" is multiplied by 1/1.66 and the result is converted into a signal level detected with the rolling shutter. In this calculation, the signal level of the pixel "I" is obtained as around 28 (47*(1/1.66)). The obtained signal level is smaller than the defect determination level, 40, this pixel is not determined as a defective pixel when the rolling shutter is used.

Thus, depending on at what position (line) on the screen the pixel is present, the signal level of the defective pixel is calculated assuming that it is read with the rolling shutter. In this case, when the rolling shutter is used, each pixel is read in the constant electric charge storage time regardless of the position on the screen (namely, the electric charge storage time varies corresponding to the distance from the predetermined position (in this case, from the first line) on the screen with a ratio of zero. On the other hand, when the global shutter is used, each pixel is read in the electric charge storage time that varies depending on the position on the screen (namely, the electric charge storage time of each pixel varies corresponding to the distance from the predetermined position (in this example, from the first line) on the screen with a predetermined ratio that is not zero). With the difference between the ratios, the signal level obtained with the global shutter is converted into the signal level obtained with the rolling shutter.

In this example, a signal level is converted with two conversion ratios that are zero (when the rolling shutter is used) and a predetermined value that is not zero (when the global shutter is used). Alternatively, a signal level may be converted with two convention ratios that are not zero.

Using the foregoing theory, when defective pixels are detected with the global shutter, the addresses of the pixels determined as defective pixels and their signal levels are stored in the storage device. Thus, when an object is imaged with the global shutter, defective pixels are compensated with the detected results. When an object is imaged with the rolling shutter, defective pixels are compensated by converting signal levels stored in the storage device into signal levels detected with the rolling shutter and then comparing the converted signal levels with the defect determination level. As a result, defective pixels are determined. In this example, the defect determination level is constant, not dependant on the position of each pixel on the screen. In other words, the defect determination level of each pixel varies corresponding to the distance from a predetermined position (in this example, the first line) on the screen) with a ratio of zero.

By contrast, when an object is imaged with the rolling shutter, defective pixels can be compensated with the detected results. However, when the electric charge storage time of each pixel with the rolling shutter is almost equal to the electric charge storage time of a pixel on the first line with the global shutter, besides defective pixels detected with the rolling shutter, there may be pixels to be considered as defective pixels when an object is imaged with the global shutter. For example, when defective pixels are detected with the rolling shutter, it is necessary to perform a defect detection process that considers the global shutter, for example, determination of whether the signal level of each pixel multiplied by a predetermined value (for example, 1.66 for the pixel "I" shown in FIG. 7A) exceeds the defect determination level.

Next, the operations of the structural devices of the imaging apparatus of the second embodiment of the present invention will be described. The operations of the signal detection circuit 211 and the controller 212 that detect defective pixels are the same as those of the imaging apparatus of the first embodiment of the present invention. Normally, the detection operation is performed with the global shutter. When the controller 212 stores the addresses of pixels determined as defective pixels to the storage device 210, the controller 212 correlatively stores the signal levels of the pixels and the addresses thereof.

The compensation process for defective pixels with the global shutter performed in the imaging apparatus of the second embodiment is the same as that of the first embodiment of the present invention. However, when the compensation process for defective pixels with the rolling shutter is performed, the controller 212 reads the addresses of pixels determined with the rolling shutter as defective pixels and signal levels thereof from the storage device 210, converts the signal levels for the rolling shutter, compares the converted signal levels with the defect determination level, and causes the defect compensation circuit 208 to perform the predetermined compensation process for pixels finally determined as defective pixels.

When the global shutter is used, the electric charge storage time of a pixel of each pixel group varies (increases) corresponding to the distance to a predetermined position (for example, the first line) with a predetermined ratio. Assuming that the electric charge storage time of the pixel "A" on the first line of the imaging device is 1, the electric charge storage time of the pixel "I" on the last line of the imaging device is 1.66 (in this case, it is assumed that the ratio is 1.66). By contrast, when the rolling shutter is used, the electric charge storage time of each pixel is constant regardless of the position of each pixel group. Thus, the variation ratio can be considered to be zero.

Since the addresses of defective pixels are stored in the storage device 210, the distances of these pixels from the first line of the imaging device can be obtained. With the distances, the variation ratio, and the signal levels stored in the storage device 210, signal levels suitable for each read method can be generated.

Next, an imaging apparatus according to a third embodiment of the present invention will be described. As a drawback, the imaging apparatus of the second embodiment uses a storage device having a large storage capacity to store the signal levels of defective pixels besides the addresses thereof. To solve such a problem, the imaging apparatus of the third embodiment detects defective pixels one time to properly compensate them in a plurality of read methods without recording the signal levels thereof.

When defective pixels are detected with the global shutter and they are compensated with the global shutter, it is preferred that the defect determination level of a pixel at the upper portion of the screen should be the same as that at the lower portion of the screen. On the other hand, when defective pixels are detected with the global shutter and they are compensated with the rolling shutter, it is preferred that the defect determination level of a pixel at the upper portion of the screen should be different from that at the lower portion of the screen (namely, the defect determination level should be proportional to the distance of a pixel to the upper portion of the screen). It is further preferred that the defect determination level should be proportional to the electric charge storage time of each pixel corresponding to the position on the screen.

Thus, to compensate defective pixels that are suitable in both the read methods, it is necessary to detect them with the foregoing defect determination levels.

Figure 10:
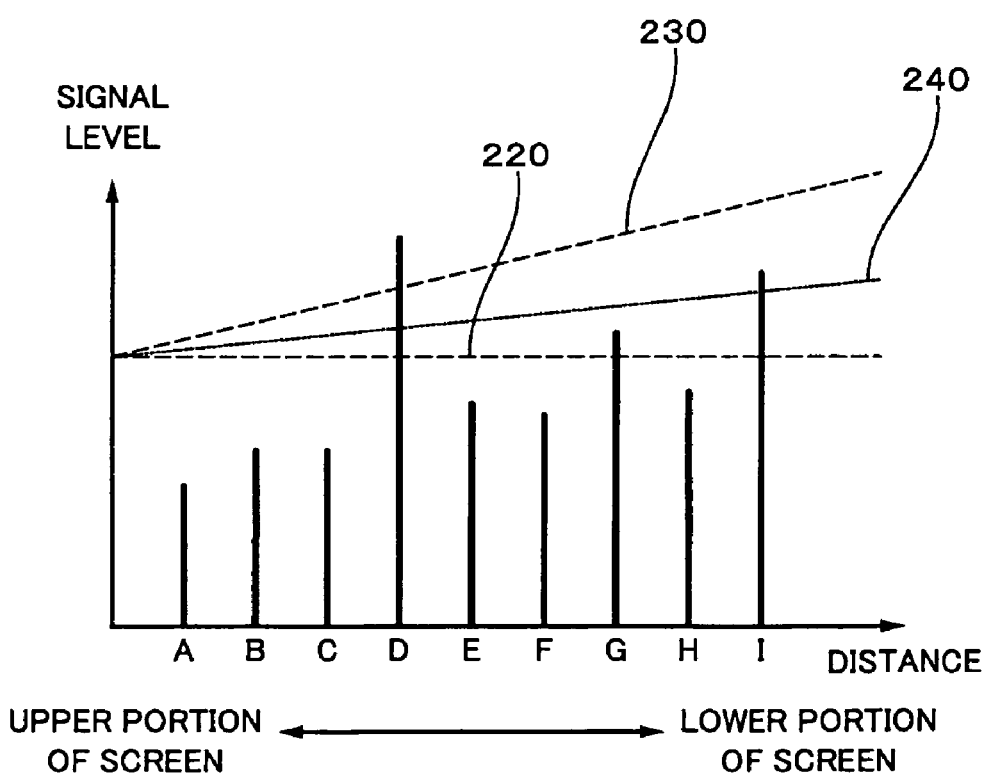
FIG. 10 is a graph describing setting of a defect determination level of an imaging apparatus according to a third embodiment of the present invention.

Now, it is considered to detect defective pixels with the global shutter. FIG. 10 is a graph showing the signal levels of pixels with the global shutter. The signal levels of the pixels shown in FIG. 10 are the same as those shown in FIG. 7B. When the signal levels of the pixels "A" to "I" are as shown in FIG. 10 and defective pixels are compensated with the global shutter, it is preferred that the defect determination level of a pixel at the upper portion of the screen should be the same as that at the lower portion of the screen as denoted by a defect determination level indication line 220. The defect determination level indication line 220 corresponds to the foregoing variation ratio of zero.

On the other hand, when defective pixels are compensated with the rolling shutter, it is preferred that the defect determination level should be proportional to the distance of a pixel to the upper portion of the screen. This defect determination level is denoted by a defect determination level indication line 230. The defect determination level indication line 230 corresponds to the foregoing ratio, 1.66. This defect determination level is substantially the same as that of the imaging apparatus of the second embodiment of which the signal level of a pixel at the lower portion of the screen is multiplied by 1/1.66 and the multiplied signal level is compared with a predetermined defect determination level. However, since the imaging apparatus of the second embodiment stores the signal levels of defective pixels, it can perform such comparisons.

The imaging apparatus of the third embodiment sets a defect determination level between the defect determination level indication line 220 and the defect determination indication line 230 (namely, the level varies between variation ratios 0 and 1.66) so that it can detect defective pixels one time and compensate them in the two read methods of the global shutter and the rolling shutter without storing the signal levels of the defective pixels. FIG. 10 shows a defect determination level indication line 240 that is set in the imaging apparatus of the third embodiment.

With the defect determination level that is proportional to the distance of a pixel to the upper portion of the screen, when any of the global shutter and the rolling shutter is used, it can be expected that defective pixels will be properly compensated.

In this method, defective pixels can be compensated in both the read methods of the global shutter and the rolling shutter with a small storage capacity of the storage device in a practical range of levels. In these two methods, defective pixels that have very large signal levels are determined as defective pixels, whereas defective pixels that are in a predetermined range of signal levels are not determined as defective pixels. Thus, the storage capacity of the storage device can be decreased.

In the imaging device of the third embodiment, the slope of the defect determination level indication line 240 can be between the variation ratio (1.66) of the ideal defect determination level indication line 230 used with the global shutter and the variation ratio (0) of the ideal defect determination level indication line 220 used with the rolling shutter. The variation ratio can be selected in accordance with the priorities of the accuracies of the global shutter and the rolling shutter, the frequencies of the read methods, and the sales strategies.

Figure 11A:
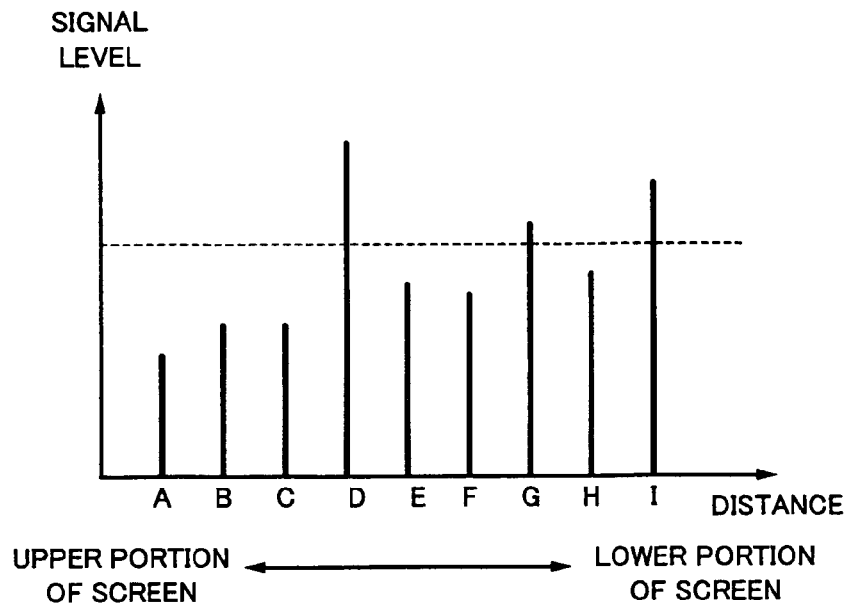
FIG. 11A and FIG. 11B are schematic diagrams describing determination of defective pixels in the imaging apparatus according to the third embodiment of the present invention.
Figure 11B:
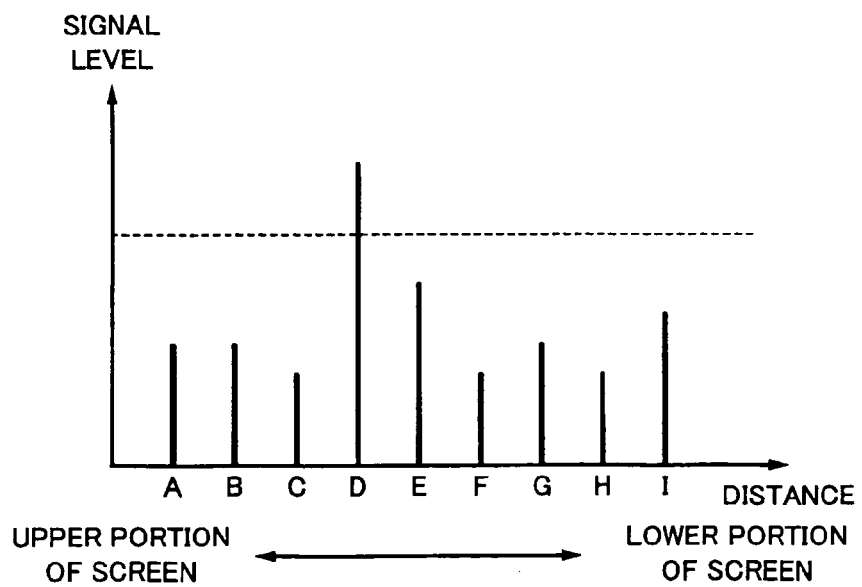

Assuming that the defect determination level has been set in accordance with the defect determination level indication line 240 shown in FIG. 10, when defective pixels are compensated with the global shutter, since the pixel "G" is not determined as a defective pixel, it is difficult to be correctly compensated. On the other hand, when defective pixels are compensated with the rolling shutter, as shown in FIG. 11B, since the pixel "I" is determined as a defective pixel, it is incorrectly compensated. Pixels that are not correctly determined and compensated are those whose signal levels are close to the defect determination level. Thus, these incorrect determinations and compensations will be practically ignorable.

Next, the operations of the structural devices of the imaging apparatus of the third embodiment will be described. The operations of the signal detection circuit 211 and the controller 212 that detect defective pixels are the same as those of the imaging apparatus of the first embodiment. The signal detection circuit 211 and the controller 212 detect defective pixels normally with the global shutter. However, the controller 212 determines defective pixels with an intermediate defect determination level such as the defect determination level indication line 240.

The compensation process of the imaging apparatus of the third embodiment is the same as that of the first embodiment because the compensation process compensates signals of pixels determined as defective pixels.

As described above, since the storage device stores only the addresses of defective pixels, the storage capacity of the storage device can be decreased. In addition, the imaging apparatus have not needed to (or does not need to) detect defective pixels in each read method at shipment or at power-on. Instead, the imaging apparatus can detect defective pixels one time with for example the global shutter.

It should be understood by those skilled in the art that various modifications, combinations, sub-combinations and alternations may occur depending on design requirements and other factors insofar as they are within the scope of the appended claims or the equivalents thereof.

What is claimed is:

1. An imaging apparatus, including:
an imaging device having a plurality of pixel groups each having at least one pixel;
signal detection means for reading stored electric charges from the pixels and outputting signals having signal levels corresponding to the amounts of stored electric charges that have been read;
defect detection means for determining whether the pixels are defective pixels corresponding to the signal levels;
storage means; and
defect compensation means,
wherein the pixels of said imaging device are controlled so that the storage electric charges are read from the pixels of said imaging device in at least a first read method and a second read method,
wherein in the first read method, the stored electric charges are read from each of the pixels so that the electric charge storage time of each of the pixel groups is proportional to the distance of each of the pixel groups to a predetermined position of said imaging device with a first ratio,
wherein in the second read method, the stored electric charges are read from each of the pixels so that the electric charge storage time of each of the pixel groups is proportional to the distance of each of the pixel groups to the predetermined position of said imaging device with a second ratio that is different from the first ratio,
wherein said defect detection means sets defect determination levels for the pixel groups in one read method selected from the first read method and the second read method, determines pixels having signal levels larger than the defect determination levels as defective pixels, and stores the addresses of the defective pixels of said imaging device and the signal levels of the defective pixels to said storage means, and
wherein when said defect compensation means compensates defective pixels in the other read method, said defect compensation means obtains the distances of the defective pixels from the predetermined position of said imaging device with the addresses of the defective pixels stored in said storage means, obtains converted signal levels of the defective pixels with the signal levels of the defective pixels stored in said storage means, the calculated distances, the first ratio, and the second ratio, compares the converted signal levels with the defect determination levels, and determines whether to compensate the defective pixels.

2. An imaging apparatus, including:
an imaging device having a plurality of pixel groups each having at least one pixel;
signal detection means for reading stored electric charges from the pixels and outputting signals having signal levels corresponding to the amounts of stored electric charges that have been read; and
defect detection means for determining whether the pixels are defective pixels corresponding to the signal levels,
wherein the pixels of said imaging device are controlled so that the storage electric charges are read from the pixels of said imaging device in at least a first read method and a second read method,
wherein in the first read method, the stored electric charges are read from each of the pixels so that the electric charge storage time of each of the pixel groups is proportional to the distance of each of the pixel groups to a predetermined position of said imaging device with a first ratio,
wherein in the second read method, the stored electric charges are read from each of the pixels so that the electric charge storage time of each of the pixel groups is proportional to the distance of each of the pixel groups to the predetermined position of said imaging device with a second ratio that is different from the first ratio, wherein said defect detection means sets defect determination levels for the pixel groups in one read method selected from the first read method and the second read method, and determines pixels having signal levels larger than the defect determination levels as defective pixels, and wherein the defect determination levels are set so that they are proportional to the distance to the predetermined position of said imaging device with a ratio between the first ratio and the second ratio.

3. An imaging method, including the steps of:

reading stored electric charges from pixels of an imaging device having a plurality of pixel groups each having at least one pixel and outputting signals having signal levels corresponding to the amounts of stored electric charges that have been read;

determining whether the pixels are defective pixels corresponding to the signal levels; and compensating the defective pixels, wherein the pixels of the imaging device are controlled so that the storage electric charges are read from the pixels of the imaging device in at least a first read method and a second read method, wherein in the first read method, the stored electric charges are read from each of the pixels so that the electric charge storage time of each of the pixel groups is proportional to the distance of each of the pixel groups to a predetermined position of the imaging device with a first ratio, wherein in the second read method, the stored electric charges are read from each of the pixels so that the electric charge storage time of each of the pixel groups is proportional to the distance of each of the pixel groups to the predetermined position of the imaging device with a second ratio that is different from the first ratio, wherein the defect detection step is performed by setting defect determination levels for the pixel groups in one read method selected from the first read method and the second read method, determining pixels having signal levels larger than the defect determination levels as defective pixels, and storing the addresses of the defective pixels of the imaging device and the signal levels of the defective pixels to a storage device, and wherein to compensate defective pixels in the other read method, the defect compensation step is performed by obtaining the distances of the defective pixels from the predetermined position of the imaging device with the addresses of the defective pixels stored in the storage device, obtaining converted signal levels of the defective pixels with the signal levels of the defective pixels stored in the storage device, the calculated distances, the first ratio, and the second ratio, comparing the converted signal levels with the defect determination levels, and determining whether to compensate the defective pixels.

4. The imaging method as set forth in claim 3, wherein each of the pixel groups is composed of pixels corresponding to one line of the imaging device, wherein in the first read method, the stored electric charges are read from the pixels so that the electric charge storage time of each of pixels of the pixel groups is the same, wherein in the second read method, the stored electric charges are read from the pixels so that the electric charge storage time is different in each of the pixel groups, the electric charge storage time of each of the pixels being proportional to the distance of each of the pixel groups to the top of the imaging device, and wherein the defect determination level of each of the pixel groups is the same.

5. The imaging method as set forth in claim 3, wherein the predetermined position of the imaging device is the first line of the imaging device.

6. The imaging method as set forth in claim 3, wherein the imaging device is light shielded for a predetermined period of the electric charge storage time.

7. An imaging method, including the steps of:

reading stored electric charges from pixels of an imaging device having a plurality of pixel groups each having at least one pixel and outputting signals having signal levels corresponding to the amounts of stored electric charges that have been read; and determining whether the pixels are defective pixels corresponding to the signal levels, wherein the pixels of the imaging device are controlled so that the storage electric charges are read from the pixels of the imaging device in at least a first read method and a second read method, wherein in the first read method, the stored electric charges are read from each of the pixels so that the electric charge storage time of each of the pixel groups is proportional to the distance of each of the pixel groups to a predetermined position of the imaging device with a first ratio, wherein in the second read method, the stored electric charges are read from each of the pixels so that the electric charge storage time of each of the pixel groups is proportional to the distance of each of the pixel groups to the predetermined position of the imaging device with a second ratio that is different from the first ratio, wherein the defect detection step is performed by setting defect determination levels for the pixel groups in one read method selected from the first read method and the second read method, and determining pixels having signal levels larger than the defect determination levels as defective pixels, and wherein the defect determination levels are set so that they are proportional to the distance to the predetermined position of the imaging device with a ratio between the first ratio and the second ratio.

8. The imaging method as set forth in claim 7, wherein the defect detection step is performed by storing the addresses of the defective pixels of the imaging device to a storage device.

9. The imaging method as set forth in claim 8, further including the steps of:

compensating signals of the defective pixels, wherein the defect compensation step is performed by obtaining the addresses of the defective pixels from the storage device so as to identify pixels to be compensated.

10. The imaging method as set forth in claim 7, wherein each of the pixel groups is composed of pixels corresponding to one line of the imaging device, wherein in the first read method, the stored electric charges are read from the pixels so that the electric charge storage time of each of pixels of the pixel groups is the same, and wherein in the second read method, the stored electric charges are read from the pixels so that the electric charge storage time is different in each of the pixel groups, the electric charge storage time of each of the pixels being proportional to the distance of each of the pixel groups to the top of the imaging device.

11. The imaging method as set forth in claim 7, wherein the predetermined position of the imaging device is the first line of the imaging device.

12. The imaging method as set forth in claim 7, wherein the imaging device is light shielded for a predetermined period of the electric charge storage time.

13. An imaging apparatus, including:

an imaging device having a plurality of pixel groups each having at least one pixel;

signal detector for reading stored electric charges from the pixels and outputting signals having signal levels corresponding to the amounts of stored electric charges that have been read;

defect detector for determining whether the pixels are defective pixels corresponding to the signal levels;

storage device; and defect compensation device wherein the pixels of said imaging device are controlled so that the storage electric charges are read from the pixels of said imaging device in at least a first read method and a second read method, wherein in the first read method, the stored electric charges are read from each of the pixels so that the electric charge storage time of each of the pixel groups is proportional to the distance of each of the pixel groups to a predetermined position of said imaging device with a first ratio, wherein in the second read method, the stored electric charges are read from each of the pixels so that the electric charge storage time of each of the pixel groups is proportional to the distance of each of the pixel groups to the predetermined position of said imaging device with a second ratio that is different from the first ratio, wherein said defect detection means sets defect determination levels for the pixel groups in one read method selected from the first read method and the second read method, determines pixels having signal levels larger than the defect determination levels as defective pixels, and stores the addresses of the defective pixels of said imaging device and the signal levels of the defective pixels to said storage means, and wherein when said defect compensation means compensates defective pixels in the other read method, said defect compensation device obtains the distances of the defective pixels from the predetermined position of said imaging device with the addresses of the defective pixels stored in said storage device, obtains converted signal levels of the defective pixels with the signal levels of the defective pixels stored in said storage device, the calculated distances, the first ratio, and the second ratio, compares the converted signal levels with the defect determination levels, and determines whether to compensate the defective pixels.

14. An imaging apparatus, including:

an imaging device having a plurality of pixel groups each having at least one pixel;

signal detector reading stored electric charges from the pixels and outputting signals having signal levels corresponding to the amounts of stored electric charges that have been read; and defect detector determining whether the pixels are defective pixels corresponding to the signal levels, wherein the pixels of said imaging device are controlled so that the storage electric charges are read from the pixels of said imaging device in at least a first read method and a second read method, wherein in the first read method, the stored electric charges are read from each of the pixels so that the electric charge storage time of each of the pixel groups is proportional to the distance of each of the pixel groups to a predetermined position of said imaging device with a first ratio, wherein in the second read method, the stored electric charges are read from each of the pixels so that the electric charge storage time of each of the pixel groups is proportional to the distance of each of the pixel groups to the predetermined position of said imaging device with a second ratio that is different from the first ratio, wherein said defect detector sets defect determination levels for the pixel groups in one read method selected from the first read method and the second read method, and determines pixels having signal levels larger than the defect determination levels as defective pixels, and wherein the defect determination levels are set so that they are proportional to the distance to the predetermined position of said imaging device with a ratio between the first ratio and the second ratio.

* * * * *